Sept. 2, 1958  G. A. KENNEDY  2,849,915
APPARATUS FOR CLEANING AND COOLING FILM IN
PHOTOGRAPHIC ENLARGERS
Filed April 12, 1955  2 Sheets-Sheet 1

GUY A. KENNEDY,
INVENTOR.

BY Eaton & Bell
ATTORNEYS.

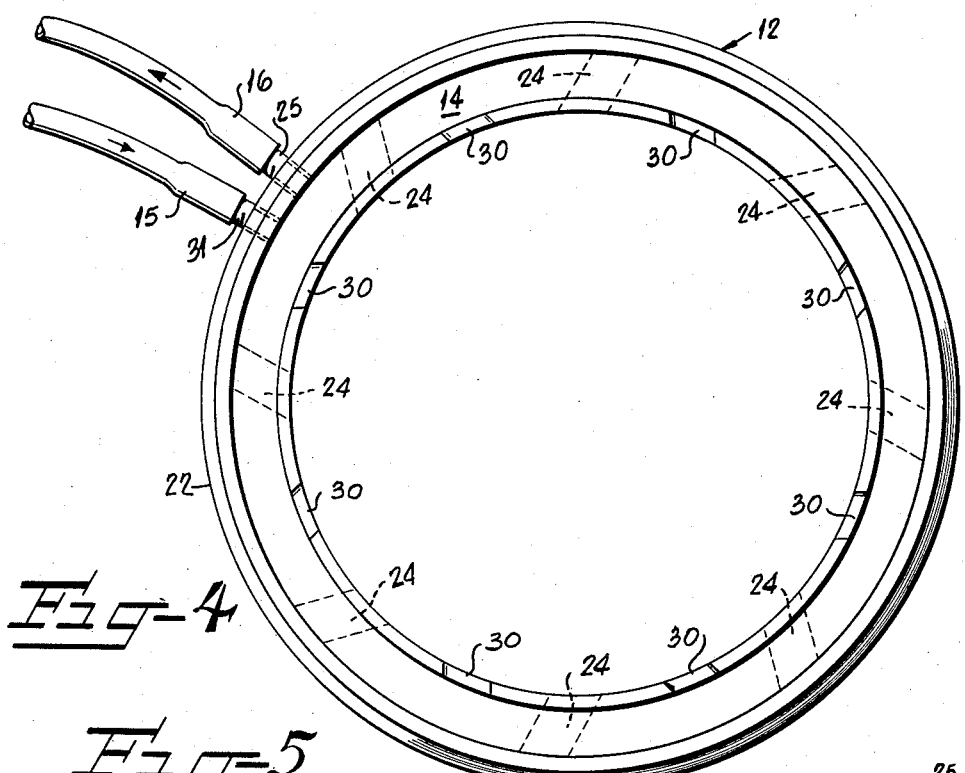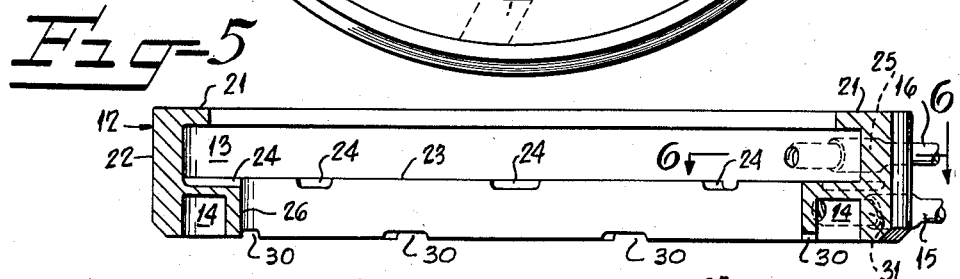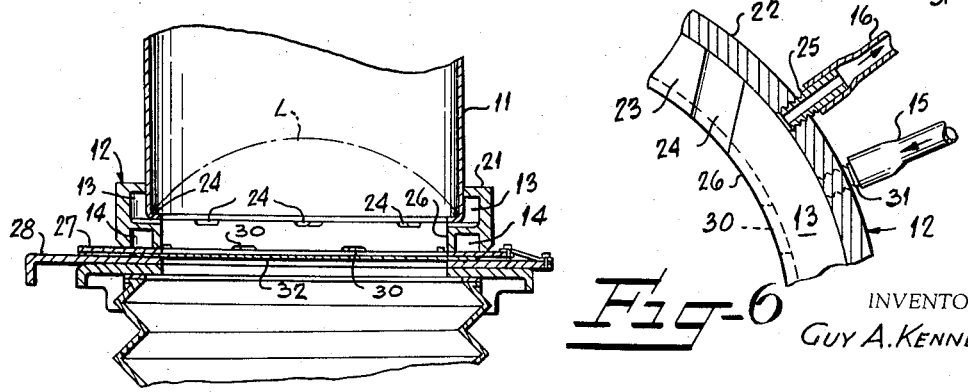
INVENTOR:
GUY A. KENNEDY.
BY Eaton + Bell
ATTORNEYS

United States Patent Office 2,849,915
Patented Sept. 2, 1958

2,849,915

APPARATUS FOR CLEANING AND COOLING FILM IN PHOTOGRAPHIC ENLARGERS

Guy A. Kennedy, Hickory, N. C., assignor of fifty percent to George H. Hargrave, Fayetteville, N. C.

Application April 12, 1955, Serial No. 500,926

11 Claims. (Cl. 88—24)

This invention relates to cooling and cleaning devices and more particularly to a device for cleaning and cooling the air above the film or negative in a photographic enlarger.

It is therefore an object of the invention to provide a cleaning and cooling device which will remove all lint and dust from the film and the chamber of the enlarger above the film and will cool the air in the chamber which has been heated by the illuminating lamp.

It is another object of the invention to provide a ring device shaped to fit the lower end of a condenser housing of an enlarger apparatus with the ring device divided into an upper and lower air chamber which are communicatively connected by air lines to a suitable air blower provided with a filter.

It is another object to provide a cooling and cleaning device comprising a ring having an upper and lower air chamber which are communicatively connected to the inside open area of the ring by a plurality of openings in each chamber, with the openings in the lower chamber serving to permit air to enter the open area of the ring in a swirling manner and the openings in the upper chamber serving to permit the air to be withdrawn from the open area of the ring.

It is a further object of the invention to provide a cleaning and cooling device which can be readily positioned in a photographic enlarger without changing or modifying any of the components of the photographic enlarger.

Some of the objects of the invention having been stated, other objects will appear as the description proceeds, when taken in connection with the accompanying drawings, in which—

Figure 4 is a bottom plan view of the cleaning and cooling device shown in Figure 2;

Figure 5 is a vertical section of the cleaning and cooling device taken along line 5—5 of Figure 2;

Figure 6 is a horizontal section taken along line 6—6 of Figure 5;

Figure 7 is a vertical section on an enlarged scale taken along the line 7—7 of Figure 1 and showing the manner in which the cleaning and cooling device is positioned in the photographic enlarger.

Figure 2:
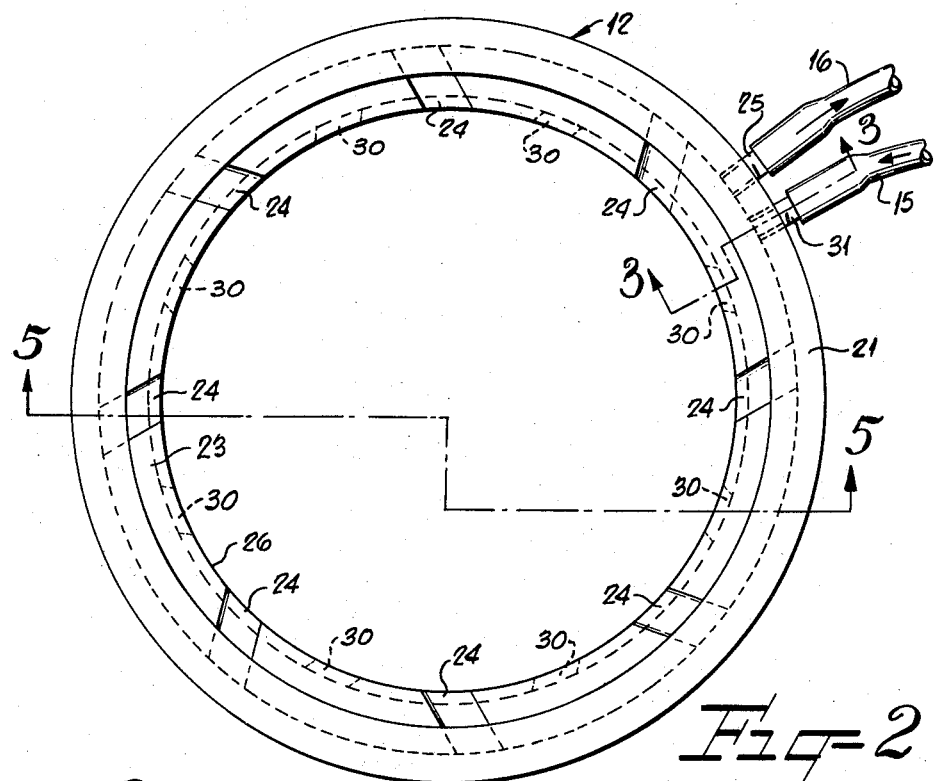
Figure 2 is an enlarged horizontal sectional view of the cleaning and cooling device taken substantially along line 2—2 of Figure 1 with the condenser housing removed for purposes of clarity.
Figure 3:
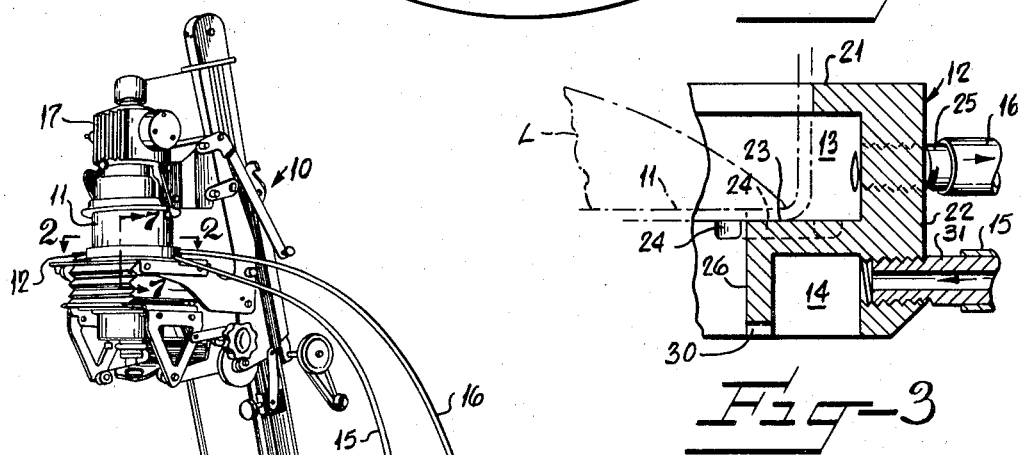
Figure 3 is a vertical section of the cleaning and cooling device taken along line 3—3 of Figure 2.
Figure 1:
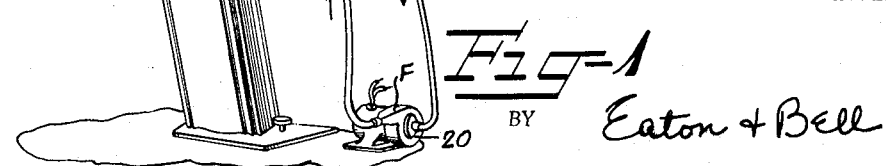
Figure 1 is an isometric view of a photographic enlarger shown with the cleaning and cooling device applied thereto.

Referring to the drawings, the numeral 10 broadly indicates a photographic enlarger having a condenser housing 11 and a lamp housing 17 containing an illumination lamp (not shown). To the lower end of the condenser housing 11 is attached a ring or air confining housing or member 12 as by a pressed fit. The ring 12 comprises an upper air chamber 13 and a lower air chamber 14 which are communicatively connected with suitable vacuum and air pressure lines or passageways 15 and 16 respectively, to the outlet and inlet side of a blower 20 provided with a filter F on the outlet side to filter the air entering line 15. The upper chamber 13 of the ring 12 is formed by an inwardly directed annular flange or top wall 21, an upper portion of side wall 22, and a bottom wall or annular shoulder 23 provided with a plurality of circularly arranged recessed portions or slots 24 therein serving as inlets to permit air to enter the chamber 13. The side of the condenser housing 11 forms the inner wall of the upper chamber 13 to confine the flow of air therein from the open area of the ring through the slots 24.

The slots or recessed portions 24 formed in the bottom portion of annular shoulder 23 are arranged in such a manner (Figures 2 and 4) to permit the air leaving the open area of the ring to enter chamber 13 from a plurality of points. A suitable connector 25 positioned in the side wall 22 of the ring 12 and connected to the line 16 permits the air to leave the chamber 13 and enter the blower 20.

The lower chamber 14 is formed by a lower portion of the side wall 22 of the ring 12, and a side wall 26 depending down from the annular shoulder 23 which serves as the top of the chamber. A negative holding plate 27 upon which the ring 12 rests serves as the bottom wall of chamber 14. A plurality of circularly arranged recessed portions or slots 30 are provided in the bottom edge of wall 26 to permit air to leave the chamber 14 and enter the open area of the ring. It will be observed in Figures 2 and 4 that the angular arrangement of these slots 30 is such that air moving out through the same into the open area of the ring will cause a swirling action.

A suitable connector 31 is provided in the lower portion of the side wall 22 of the ring 12 for the line 15 through which the air from the outlet side of the blower 20 enters the chamber 14 and passes through slots 30 to collect the dust and lint which might have accumulated on a negative or film 32 held between an upper and lower negative holding plate 27 and 28, respectively.

The slots 24 (Figures 2 and 4) are equally spaced and circularly arranged and each slot extends in a given angular relation to one side of a corresponding imaginary radial line of the ring 12. The slots 30 are also equally spaced and circularly arranged but are positioned below and intermediate slots 24. Each of the slots 30 also extends in angular relation to one side of a corresponding imaginary radial line of the ring 12, with this angular relation being substantially the same as the given angular relation of the slots 24, but on the other side of the corresponding radial line.

It will be observed in Figures 2 and 4 that the slots 24 are arranged in the ring 12 inclined at an angle opposite from the angle formed by the slots 30. This particular arrangement permits the obtaining of a greater swirling action of the air currents above and in contact with the negative 32 to thus retract more of the dust and lint through the slots 24 provided in the upper chamber 13 which are communicatively connected to the inlet side of the blower 20 by the air line 16.

The lamp housing 17 is above the condensers L (only one of which is shown) in the housing 11, and the heat is from the rays of the lamp in housing 17 passing through these condensers and through the negative. It will be appreciated that the air which has been heated to a great degree by this lamp will be cooled or maintained at a lower constant temperature by this flow of air coming through the slots 30 in the chamber 14 into the open area of the ring 12 and condenser housing 11. This cooling or reducing the temperature of the air which is in contact with the negative or the film 32 helps to maintain the negative or film 32 at a constant temperature thereby prevening the film from expanding and buckling, which would necessitate refocusing of the enlargement device.

Since the air leaving the chamber 13 is filtered in the blower 20 prior to entering the chamber 14, it will be appreciated that it is absolutely impossible for lint or dust to be on the negative 32 while printing the same.

Accordingly, it will be appreciated there has been provided a novel cooling and cleaning attachment for a photographic enlarger which cleans all the impurities such as dust, lint and the like from the air which is in contact with the top surface of the negative which is to be printed, and also cools or maintains at a lower temperature the air in contact with the film or negative.

The photographic enlarger shown in the drawings is an Omega B-6 manufactured by Simmons Brothers, Inc., of Long Island City, New York, but it is understood that the cleaning and cooling system will work equally as well with other photographic enlargers and other photographic printing devices, by changing the dimensions of the device, to fit the particular enlarger or printing device used.

In the drawings and specification there has been set forth a preferred embodiment of the invention and, although specific terms are employed, they are used in a generic and descriptive sense only, and not for purposes of limitation, the scope of the invention being defined in the claims.

I claim:

1. An air cleaning and cooling device for use with a photographic enlarger having a lamp and condenser housing and an upper and lower negative holding plate for clamping a negative therebetween, said device comprising a ring adapted to be connected to the lower end of the condenser housing and above the negative, an upper and lower chamber formed in said ring, a blower having a filter, intake and outlet sides, air lines connecting the intake and outlet sides of said blower with said corresponding chambers in said ring, and each of said chambers having a plurality of openings formed therein to communicatively connect with the air above the negative in the enlarger whereby the air in contact and above the negative will be continuously circulated through the blower to cool and filter the same.

2. A cleaning and cooling device for use with a photographic enlarger having a lamp and condenser housing, and upper and lower negative holding plates for securing a negative therebetween, said cleaning and cooling device comprising a ring encircling the lower portion of the condenser housing, an internal annular shoulder separating the ring into an upper and lower chamber, each chamber having a plurality of openings therein to communicatively connect with the air above the negative, a blower provided with a filter, and inlet and outlet sides, and means for connecting the upper and lower chambers of said ring with the inlet and outlet sides respectively of said blower.

3. A cleaning and cooling device for use with a photographic enlarger having a lamp and condenser housing and an upper and lower negative holding plate for supporting a negative therebetween, said device comprising a ring adapted to be connected to the lower end of the condenser housing, means separating said ring into an upper and lower chamber, at least a portion of the upper chamber being positioned to surround a portion of the lower end of the condenser housing, each of said chambers having a plurality of spaced openings therein communicating with the air above the negative, adjacent openings in one of said chambers having openings of the other chamber, positioned therebetween whereby the openings in the respective chambers are alternately arranged on different levels, the openings of said one chamber being positioned at an opposite angle from the openings of said other chamber, a blower having intake and outlet sides, and means connecting the intake and outlet sides of said blower to the respective upper and lower chambers of the ring.

4. An air cleaning and cooling device for use with a photographic enlarger having a housing and an upper and lower negative holding plate for clamping a film therebetween, said device comprising a ring engaging the lower portion of the housing, said ring having an annular internal shoulder dividing the ring into an upper and lower chamber, each of said chambers having a plurality of openings formed therein to communicatively connect with the air above the film, and air circulating means connected to each of said chambers whereby the air above the film will be continuously circulated.

5. An air cleaning and cooling device for use with a photographic enlarger having a housing and an upper and lower negative holding plate for clamping a film therebetween, said device comprising a ring adapted to be connected to the lower end of the housing with its lower edge engaging the upper holding plate, said ring having an upper and lower chamber formed therein, each of said chambers having a plurality of openings formed therein to communicatively connect with the air above the film, and means for circulating and filtering the air in said chambers and above the film whereby the air in contact with the film will be cleaned and cooled.

6. A cleaning and cooling device for use with a photographic enlarger having a housing, and supporting means for a negative therebelow, said cleaning and cooling device comprising a ring adapted to be attached to the lower portion of the housing and to engage the supporting means for the negative, two chambers provided in said ring, each chamber having a plurality of circularly arranged outlets therein to communicatively connect with the air above the negative, the outlets of one of said chambers being in substantially the same plane as the negative, a blower provided with a filter and inlet and outlet sides, and means for connecting said chambers of said ring with the inlet and outlet sides of said blower with the outlet side of the blower being connected to said one chamber whereby the air emitting through the plurality of outlets therein will sweep the upper surface of the negative to clean the same.

7. An air circulating device for use with a photographic enlarger having a housing and means supporting a negative, said device comprising a ring, means separating said ring into two chambers, each of said chambers having a plurality of circularly arranged spaced slots therein communicating with the air above the negative, each of the slots in one of said chambers having slots of the other chamber separating adjacent slots of said one chamber with the slots of said one chamber positioned at an opposite angle from the slots of the other chamber, a blower having outlet and intake sides, and means connecting the outlet and intake sides of said blower to said two chambers of the ring.

8. An air circulating device for use with a photographic enlarger having a lamp and condenser housing and supporting means for a negative, said device comprising an air confining housing adapted to be connected to the lower end of the condenser housing above the supporting means for the negative, means separating said air confining housing into upper and lower chambers, each of said chambers having a plurality of spaced slots therein communicating with the air above the negative, a blower having an outlet and intake, and means connecting the outlet and intake of the blower to the respective chambers of said air confining housing.

9. In a device according to claim 8 wherein said spaced slots are substantially equally spaced and each slot of one chamber extends in given angular relation to one side of a corresponding imaginary radial line of said air confining housing, and each of the slots of the other chamber extends in angular relation to a corresponding imaginary line of said air confining housing, the latter angular relation being substantially the same as said given relation, but on the other side of the corresponding radial line.

10. An air circulating device for a photographic enlarger having a lamp and condenser housing and supporting means for a negative, said device comprising an air confining housing adapted to be connected to the lower end of the condenser housing above the supporting means for the negative and having upper and lower chambers therein, each of said chambers having at least one opening therein communicating with the air above the negative, blower means having a filter, intake and outlet sides, and means connecting the intake and outlet sides of said blower means to the respective chambers of the air confining housing whereby the air in contact with the negative will be cleaned and cooled.

11. An air cleaning and cooling device for use with a photographic enlarger having a lamp and condenser housing and upper and lower negative holding plates for clamping a negative therebetween, said device comprising an annular ring having a side wall adapted to be connected to the lower end of the condenser housing with the lower end of the device engaging the upper negative holding plate, an annular shoulder extending inwardly from a medial portion of the side wall to divide the ring into an upper and lower chamber, the lower end of the condenser housing being positioned on said annular shoulder and serving as the inner wall for the upper chamber, an annular flange extending inwardly from the upper portion of the side wall and overlying in spaced relation a portion of said shoulder to serve as a top wall for the upper chamber, an inner wall concentrically arranged with said side wall and depending from the inner end of said shoulder to serve as the inner wall for the lower chamber, a blower having a filter, and intake and outlet sides, air lines connecting the intake and outlet sides of the blower with the respective upper and lower chambers in said ring and each of said chambers having a plurality of openings formed therein to communicatively connect with the air above the negative in the enlarger, the openings in the lower chamber being positioned along the lower edge thereof in substantially the same plane as the negative whereby air passing through the openings in the lower chamber will sweep across the upper surface of the negative to clean and reduce the temperature of the same.

References Cited in the file of this patent
UNITED STATES PATENTS

| | | |
|---|---|---|
| 1,357,621 | Proszynski | Nov. 2, 1920 |
| 1,717,234 | Lentini | June 11, 1929 |
| 1,770,659 | Oehmichen | July 15, 1930 |
| 1,885,642 | Strong | Nov. 1, 1932 |
| 1,966,531 | Tint | July 17, 1934 |
| 2,029,871 | Johnson | Feb. 4, 1936 |
| 2,103,766 | Cahill | Dec. 28, 1937 |
| 2,229,760 | Mueller | Jan. 28, 1941 |
| 2,443,171 | Tuttle | June 8, 1948 |